Sept. 6, 1955
L. F. BELDT ET AL
2,716,896
ROTATION LIMIT DEVICE
Filed Oct. 8, 1952
2 Sheets-Sheet 1
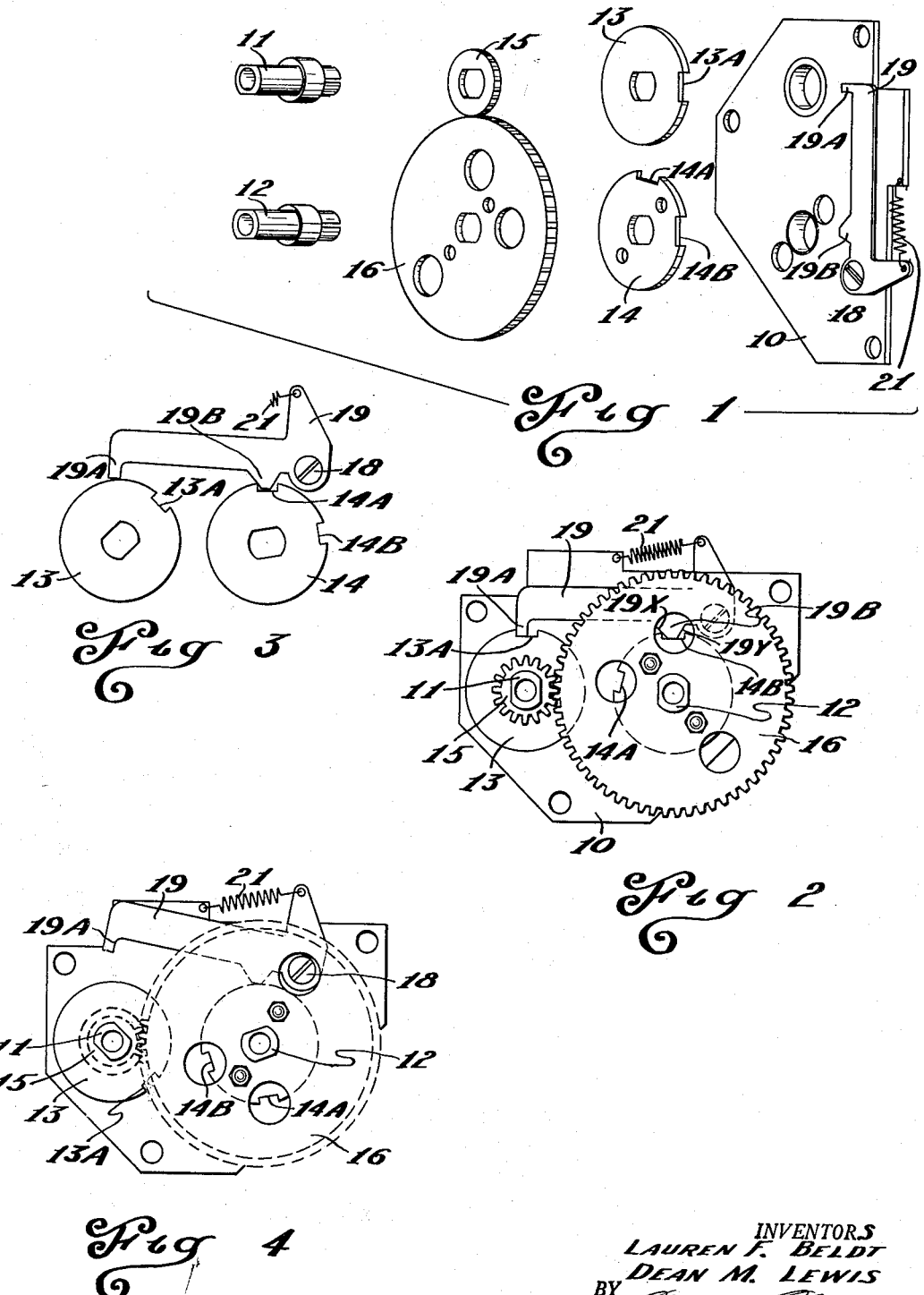
INVENTORS
LAUREN F. BELDT
DEAN M. LEWIS
BY
ATTORNEY

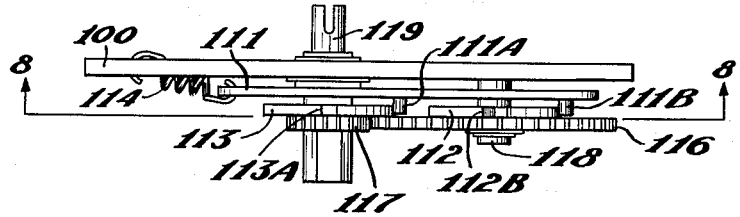
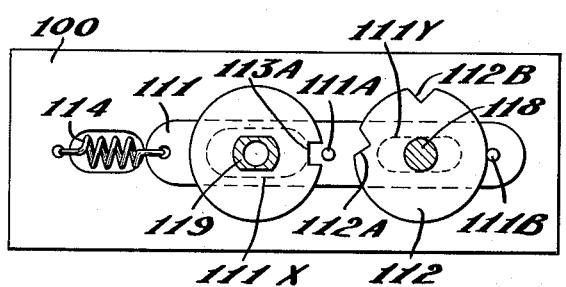
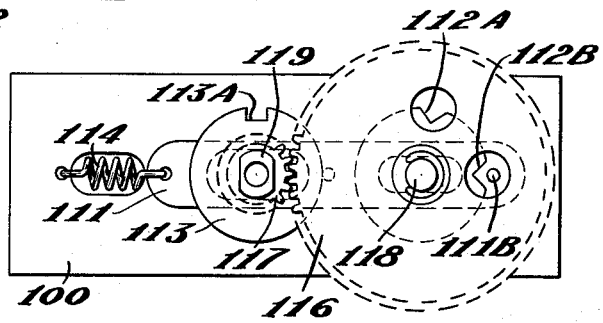
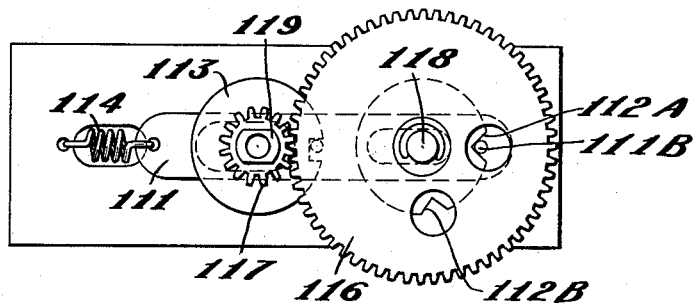

United States Patent Office 2,716,896
Patented Sept. 6, 1955

2,716,896

ROTATION LIMIT DEVICE

Lauren F. Beldt and Dean M. Lewis, Cedar Rapids, Iowa, assignors to Collins Radio Company, Cedar Rapids, Iowa, a corporation of Iowa Application October 8, 1952, Serial No. 313,732

9 Claims. (Cl. 74—10.2)

The present invention relates to a rotation limit device, and more particularly to an improved mechanism for controlling the rotation of a shaft between terminal limits. Specifically, this invention prevents the rotation of a shaft outside a selected number of revolutions which may range from less than one to a large number of rotations.

Apparatus of this general type has been the subject of a number of patents heretofore issused, such as Collins' Patent No. 2,546,980 and May's Patent No. 2,391,470. Prior devices for positively mechanically limiting the rotation of a shaft have involved a driven ring with an external projection. The controlled ring in those devices has a projection requiring a two-pronged pawl. Those devices required a much larger gear ratio between the controlling ring and driven ring to obtain a wide range of rotation as will be more fully understood by reference to the above patents.

We have developed and are here disclosing and claiming a device for limiting the rotation of a shaft. It might be used to limit the rotation of a control shaft of a slug-tuned coil. A slug-tuned coil, for example, may be rotated through only a limited number of turns. Rotation in either direction beyond this damages the device.

This invention can also be used in devices where a "home position" is required before automatic tuning can be accomplished.

A principal object of this invention is to provide a rotation limiting device which obtains a large rotation range with a small gear ratio. For example, in one embodiment of this invention, with a gear ratio of sixty-three to sixteen and slots on the driven cam located 80 degrees apart, the rotational range of the controlled ring is 52 revolutions.

Other objects, features and advantages will be apparent from the following specifications and drawings, in which:

Figure 1 is an exploded view of the embodiment of our invention;

Figure 2 is a front elevational view of one embodiment of our invention. It is shown in locked position at a rotational limit;

Figure 3 illustrates the pawl, the driven stop-cam, and the controlled stop-cam in a fragmentary detail view in the unlocked position;

Figure 4 illustrates the mechanism in an unlocked position;

Figure 5 is a front elevational view of another embodiment of our invention using a reciprocating locking bar. It is shown in locked position at a rotational limit;

Figure 6 illustrates the mechanism of Figure 5 in an unlocked position;

Figure 7 is a top view of the embodiment shown in Figure 5; and

Figure 8 is a sectional view taken on line 8—8 of Figure 7.

As shown in Figures 1, 2, 3 and 4, a shaft 11 is rotatably supported by a frame 10. A second shaft 12 is also rotatably supported by frame 10.

A controlled cam 13 is non-rotatably mounted on shaft 11. A driven cam 14 is non-rotatably mounted on shaft 12. A first gear 15 is received on shaft 11 and a second gear 16 is supported by shaft 12. Gear 15 meshes with gear 16.

A limiting means or pawl 19 is rotatably supported on frame 10 by a stub shaft 18. A spring 21 is fixed to frame 10 at one end and to pawl 19 at the other end. The spring biases pawl 19 in a counterclockwise direction with reference to Figure 2.

Figure 2 illustrates the position of parts in the mechanism when the controlled shaft 11 is locked in the clockwise direction of rotation while free to rotate in the counterclockwise direction. In this position, pawl projection 19B engages a first slot 14B formed in driven cam 14 and pawl projection 19A engages cam slot 13A formed in controlled cam 13.

The pawl projections are held in their respective cam slots by the spring 21. Control shaft 11 cannot move in a clockwise direction because pawl projection 19A bears against the left wall of slot 13A.

Shaft 11 can, however, rotate in the opposite direction. If it is moved counterclockwise, projection 19A will be cammed out of slot 13A by the cam action of the left edge of slot 14B on projection face 19X of projection 19B. It is to be noted that projection 19B is formed with tapered sides so that it may be cammed upwardly. It is to be noted that projection 19A has clearance on the right side as shown in Figure 2. Otherwise, no motion of cams 13 and 14 could result.

After projection 19B is forced out of slot 14B, projection 19B will ride on the periphery of cam 14 and pawl 19 will assume a position such as shown in Figure 4.

After shaft 11 with cam 13 has been rotated counterclockwise about 315 degrees from the terminal position of Figure 2, cam 14 will have rotated clockwise about 80 degrees due to the gear reduction. Pawl 19 and cams 13 and 14 will then be in the position shown in Figure 3. In Figure 3, projection 19B engages a second slot 14A formed in cam 14. The pawl then partially drops and projection 19A strikes the periphery of cam 13. Locking cannot occur because projection 19A does not line-up with slot 13A. As cam 14 rotates further, projection 19B will be cammed out of slot 14A and the pawl 19 will again be in the position shown in Figure 4.

As the controlled shaft continues to rotate in a counterclockwise direction, pawl projection 19B will from time to time engage either slot 14A or 14B. No locking can occur as long as projection 19A does not line-up with slot 13A.

Eventually pawl projection 19A will line up with slot 13A simultaneously when projection 19B lines up with slot 14A and locking will occur. In this position, pawl projection 19A will bear against the right face of slot 13A. It has then reached the terminal position in this direction.

In the event it is desired to rotate it in the opposite direction the operation is similar to that described above. It is to be noted, however, that at the counterclockwise limit, not shown, the relationship between the pawl projection 19A and the slot 13A is such that there is space between the projection 19A and the left wall of the slot. Projection 19B will then engage slot 14A.

In a model constructed by applicants, the controlled gear 15 had 16 teeth and the driven gear 16 had 63 teeth. This gave a gear ratio of slightly less than 4 to 1. Slots 14A and 14B on the driven cam 14 were 80 degrees apart. With this structure the controlled shaft 11 rotated 52 turns between terminals.

The model could also be made to operate over a three turn range. This was accomplished by manually lifting pawl 19 at either terminal of the 52 turn range and rotating the controlled shaft 11 beyond that terminal. The pawl was then released. The controlled shaft 11 rotated seven turns and locked. When reversed, it traveled three turns and locked. It thereafter had an oscillating range of three turns between terminals.

A return to the 52 turn range was obtained by manually lifting the cam at one terminal of the three turn range and rotating it beyond that terminal until it locked. It was then in the 52 turn range.

The terminal positions for the model constructed are diagrammatically shown below. The vertical dotted lines are terminal positions and the numbers represent revolutions. The numbers above the line represent clockwise rotation by controlled shaft 11 and numbers below represent counterclockwise rotations of the controlled shaft 11. T represents transitional rotations through which shaft 11 turns when the 52 turn range was changed to a three range and vice-versa.

| clockwise | | | | | | | | |
|---|---|---|---|---|---|---|---|---|
| 52 | 4T | 3 | 4T | 52 | 4T | 3 | 4T | 52 |
| 52 | 4T | 3 | 4T | 52 | 4T | 3 | 4T | 52 |
| counterclockwise | | | | | | | | |

The amount of rotation between terminals can be varied by controlling any one or more of the following: The width of slot 13A, the number of slots on cam 13, the angular distance between slots 14A and 14B, the number of slots on cam 14, and the gear ratio.

As stated above, projection 19B moves in and out of slots 14A and 14B during the rotation of driven cam 14, and pawl 19 moves in reciprocating motion. This motion is controlled by the angle that projection faces 19X and 19Y make with the longitudinal axis of the pawl. In the specific embodiment shown, the angle of projection face 19Y is 45 degrees, and the angle of projection face 19X is 30 degrees. The difference in face angles substantially compensates for the difference in distance of the faces 19X and 19Y from the fulcrum stub shaft 18. The difference in angles of faces 19X and 19Y allow a substantially equal acceleration of pawl 19 in its upward and downward movement.

At one terminal position, projection 19B will engage slot 14A. At the other terminal position, projection 19B will engage slot 14B. Figures 5, 6, 7 and 8 show another embodiment of our invention. This embodiment operates in the same manner and according to the same principles as the embodiment in Figure 1. A spring-loaded bar with two projecting pins is substituted for the pawl.

A controlled shaft 119 is rotatably mounted on frame 100. A controlled cam 113 and a controlled gear 117 are non-rotatably mounted on shaft 119. A driven shaft 118 is rotatably mounted on frame 100. Driven cam 112 and driven gear 116 are non-rotatably mounted on shaft 118. The gear 116 meshes with gear 117.

A limiting means or bar 111 is formed with a pair of oblong openings 111X and 111Y with their major axes extending longitudinally of the bar. Shafts 118 and 119 extend, respectively, through openings 111X and 111Y.

The limiting bar 111 carries a pair of projections or pins 111A and 111B mounted adjacent the center and the end, respectively.

A spring 114 is mounted to the frame 100 and has its opposite end attached to the limiting bar 111 so as to bias it toward the left, relative to Figure 5.

The pins 111A and 111B ride, respectively, on the peripheries of cam wheels 113 and 112 and are engageable in slots 113A, 112A and 112B formed therein, respectively.

The limiting bar is not able to lock unless pins 111A and 111B simultaneously line up with a slot in their respective cams, just as the embodiment of Figure 2 could not lock until a slot lined up with each pawl projection. The controlled shaft 119 is allowed to turn more than one revolution because the cams are rotating at different speeds due to a gear ratio different than one.

The width of slot 113A must be such that pin 111A will lock in the proper direction and release in the other direction.

The operation of this apparatus is the same as the modification of Figure 2 with the exception that the locking bar replaces the pawl.

While we have shown and described certain embodiments of our invention, it is to be understood that it is capable of many modifications. Changes, therefore, in the construction and arrangement may be made without departing from the spirit and scope of the invention as disclosed.

We claim:

1. Apparatus for limiting the rotation of a pair of shafts comprising, a frame member rotatably supporting said shafts, a first cam mounted on the first shaft, a second cam mounted on the second shaft, said first cam formed with a slot in its periphery, said second cam formed with a pair of slots in its periphery, a pawl pivotally supported on said frame member and formed with a pair of projections, the first projection of said pawl engageable with the first cam and said first projection substantially narrower than the slot formed in said first cam, said second projection engageable with the first and second slots formed in the second cam and said second projection generally V-shaped in form.

2. A rotational limit device comprising, a frame, a pair of shafts rotatably supported by said frame, a gear train coupling said shafts, a first cam formed with two slots in its periphery and fixed to one of said shafts, a second cam formed with a single slot in its periphery and fixed to the other shaft, a spring biased limiting means supported by said frame, a pair of projections on said limiting means respectively adjacent to each cam for engagement with said slots, the slots in said first cam formed so that rotation of said first cam dis-engages the first projection of the locking means from said slots, and the slot in said second cam wider than the second projection of the locking means to allow the projection to be dis-engaged when said shafts are rotated from a rotational limit.

3. A rotational limit device comprising, a frame, a plurality of shafts rotatably supported by said frame, a gear train coupling said shafts, a plurality of slotted cams formed with slots in their periphery and respectively fixed to said shafts, a spring biased limiting means supported by said frame, a plurality of projections supported by said limiting means and a respective projection adjacent each of said cams for engagement with said slots, one of said cams formed with slots that slope so that rotation of said first cam disengages said limiting means from all cams, and the slots in said remaining cams wide to allow an engaging projection to be cammed out.

4. A mechanism for limiting the rotation of a shaft in each direction comprising, a frame, a first shaft rotatably supported by said frame, a first cam with one slot formed in its periphery mounted on said first shaft, a first gear mounted on said first shaft, a second shaft rotatably supported by said frame, a second cam mounted on said second shaft and formed with two slots in its periphery, a second gear mounted on the second shaft and engaged by the first gear, a spring biased pawl pivotally supported by said frame, first and second projections supported by said pawl and engageable, respectively, with the slots in said first and second cams, said first projection substantially narrower than the slot in said first cam, and said second projection formed with sloped sides that allow rotation by said second cam to remove an engaged second projection.

5. A mechanism for limiting the rotation of a shaft comprising, a frame, a first shaft rotatably supported by said frame, a first circular cam formed with one slot in its periphery and supported by said first shaft, a first gear mounted on said first shaft, a second shaft rotatably mounted on said frame, a second circular cam formed with two slots in its periphery and mounted on the second shaft, a second gear mounted on said second shaft and in mesh with said first gear, a spring-loaded pawl pivotally supported by said frame and formed with first and second projections, said first projection receivable in the slot on the first cam when aligned and said slot formed substantially wider than said first projection, said second projection receivable in either slot in the second cam when aligned and formed with sloping sides to allow removal by cam rotation, and unidirectional latching occurring when both projections are simultaneously aligned.

6. A mechanism for limiting the rotation of a shaft comprising, a frame, a first shaft rotatably supported by said frame, a first circular cam formed with one slot in its periphery and supported by said first shaft, a first gear mounted on said first shaft, a second shaft rotatably mounted on said frame, a second circular cam formed with two outwardly sloping slots in its periphery and mounted on the second shaft, a second gear mounted on said second shaft and in mesh with said first gear, a spring-loaded limiting bar formed with a pair of openings through which the first and second shafts extend, first and second pins mounted on said limiting bar and engageable, respectively, with the slots in the first and second cams when aligned, and said first pin substantially narrower than the slot which it engages.

7. Apparatus for limiting the rotation of a plurality of shafts comprising, a frame member rotatably supporting said plurality of shafts, a plurality of cams mounted on said shafts, a plurality of gears mounted on said shafts and in mesh, a pawl pivotally supported by said frame member and formed with a plurality of projections respectively engageable with said cams, all but one of said cams formed with a slot substantially wider than the projections, and said remaining cam formed with a plurality of V-shaped slots to cam out the engaging projection.

8. Apparatus for limiting the rotation of a plurality of shafts comprising, a frame member rotatably supporting said plurality of shafts, a plurality of cams mounted on said shafts, a plurality of gears coupling said shafts, a spring biased limiting bar formed with a plurality of openings through which said shafts extend, a plurality of pins supported by said limiting bar with pins engageable with each cam, all but one of said cams formed with a slot substantially wider than the pins, and said remaining cam formed with a plurality of generally V-shaped slots.

9. A rotation limit device with a plurality of gear-coupled shafts rotatably supported by a frame comprising, a plurality of circular cams with a separate cam fixed to each of said shafts, all but one of said cams formed with a generally rectangular slot in each of their peripheries, a limiting means supported from said frame and movable with respect to said frame, a plurality of projections formed on said limiting means with a separate projection adjacent each of said cams, all but one of said projections substantially narrower than the slots, the remaining cam formed with two slots in its periphery, the remaining projection and the slots of said remaining cam formed with outwardly sloping sides to cam out the remaining projection, and a spring mounted between said limiting means and said frame to bias all projections against the cams.

References Cited in the file of this patent

UNITED STATES PATENTS

| | | |
|---|---|---|
| 1,795,420 | Beall | Mar. 10, 1931 |
| 2,576,505 | Merles | Nov. 27, 1951 |